United States Patent [19]
Lourman

[11] Patent Number: 6,037,012
[45] Date of Patent: Mar. 14, 2000

[54] PROCESS FOR APPLYING WATER-BASED PRODUCTS SUCH AS PAINTS AND VARNISHES TO GLASS OBJECTS

[75] Inventor: Didier Lourman, Lafresguinont Saint Martin, France

[73] Assignee: Societe Autonome de Verreries SA, Feuquieres, France

[21] Appl. No.: 09/155,998

[22] PCT Filed: Apr. 15, 1997

[86] PCT No.: PCT/FR97/00675
§ 371 Date: Mar. 8, 1999
§ 102(e) Date: Mar. 8, 1999

[87] PCT Pub. No.: WO97/38946
PCT Pub. Date: Oct. 23, 1997

[30] Foreign Application Priority Data

Apr. 16, 1996 [FR] France .................................. 96 04743

[51] Int. Cl.[7] .............................. B05D 1/06; B05B 5/025
[52] U.S. Cl. ......................... 427/475; 427/479; 427/480; 427/483; 427/486; 118/629; 118/631; 118/634; 361/228
[58] Field of Search ..................................... 427/475, 477, 427/483, 486, 479, 480, 481, 484; 361/226, 227, 228; 118/629, 631, 634

[56] References Cited

U.S. PATENT DOCUMENTS 4,116,904  9/1978  Verma .
5,698,269  12/1997  Carlblom et al. .

FOREIGN PATENT DOCUMENTS 0 560 199  9/1993  European Pat. Off. .
25 17 504  7/1976  Germany .

*Primary Examiner*—Fred J. Parker
*Attorney, Agent, or Firm*—Nilles & Nilles SC

[57] ABSTRACT

A process for applying water-based paints and/or varnishes to the surface of a glass article which includes the steps of charging a composition of water-based product to a potential of a given polarity, spraying the composition of the water-based product and diffusing the resulting particles in a wide area so as to form a mist (120, 121), placing the glass article (200) in contact with an electrode at a potential of another given polarity and maintaining its surface temperature between 15° C. and 30° C., and bringing the glass article into the field of the mist making it possible to obtain various appearances of coloration in the glass article.

25 Claims, 2 Drawing Sheets

```
┌─────────────────────────────┐
│   ELECTRICALLY CHARGE THE   │─── 1
│  WATER-EMULSIFIED PRODUCT   │
└─────────────────────────────┘
              │
              ▼
┌─────────────────────────────┐
│         SPRAY THE           │
│     WATER-EMULSIFIED        │─── 2
│          PRODUCT            │
└─────────────────────────────┘
              │
              ▼
┌─────────────────────────────┐
│      DIFFUSE THE FINE       │─── 3
│     PARTICLES AS A MIST     │
└─────────────────────────────┘
              │
              ▼
┌─────────────────────────────┐
│   PLACE THE ARTICLES IN     │─── 4
│      THE FIELD OF MIST      │
└─────────────────────────────┘
```

*FIG. 1*

PROCESS FOR APPLYING WATER-BASED PRODUCTS SUCH AS PAINTS AND VARNISHES TO GLASS OBJECTS

BACKGROUND OF THE INVENTION

1. Field of the Invention

The present invention relates to a process for applying water-based products, in particular water-based paints and/or varnishes, to the surface of glass articles. This process makes it possible to obtain various appearances such as an appearance of coloration in the bulk of the glass, a chemical satin-effect appearance or an enameled appearance. It is intended in particular for decorating jars, flasks, bottles or carafes of any type.

2. Discussion of the Related Art

The standard processes for applying varnish to glass articles consist in spraying the products onto their walls using a more or less complex array of pneumatic spray guns. However, the use of these processes involves many problems, and the results obtained are not satisfactory.

The deposition yields are generally less than 50%. These yields are proportionately lower the more complex the shape of the articles, this shape determining the number of spray guns required to obtain a homogeneous deposit on the surface of the articles. However, the larger the number of spray guns, the more complex it is to adjust the parameters relating to these spray guns in a manufacturing unit. In point of fact, these adjustments can last several hours, and it is necessary to remember not only the spatial position of each of the spray guns, but also their operating characteristics (air pressure for spraying, product pressure, nozzle diameter, horn pressure, type of cap, etc.) in order to ensure good reproducibility of the processes over time.

Despite the large number of spray guns which can be used and the tiresome adjustments which need to be carried out, the shape of certain articles is such that there are areas in which it is still difficult, or even impossible, for the sprayed product to reach.

Moreover, a homogeneous deposit of water-based paints and/or varnishes, containing very fine particles of resin in suspension in water, is particularly difficult to make. Water is in particular a solvent which is very difficult to spray, and pneumatic spray guns do not manage to disperse particles of homogeneous size. The particles ejected by the spray guns are, in point of fact, coarse in the axis of projection and increasingly fine on either side of this axis. This size disparity of the product particles has the consequence of giving rise to phenomena which interfere with the production of a high-quality deposit. Thus, the finest particles of varnish have a tendency to dry before reaching the glass substrate, or even of drying too quickly on this substrate, which gives rise to localized powdering, spattering and pitting effects on the surface of the treated articles. On the other hand, the coarsest particles of varnish are slow to dry after being sprayed on the surface of the articles, so much so that orange-peel effects, running and local excess thicknesses appear, which thus degrade the quality of the coating on the treated articles.

A first solution for overcoming all of these drawbacks consists in increasing the spraying air pressure excessively. However, this solution cannot be considered seriously since it does not allow the quality of the coating to be improved significantly and it also involves a considerable reduction in the spraying yield, which is, however, already very low.

OBJECTS AND SUMMARY OF THE INVENTION

The process according to the present invention makes it possible to solve all of these implementation problems and to obtain articles with a very high-quality coating. To do this, it includes:

charging a composition of water-based products to a potential of a given (i.e., negative or positive) polarity, and maintaining their surface at a temperature of between 15° C. and 30° C., spraying the composition of this water-based product and diffusing the resulting particles in a wide area so as to form a mist, placing the glass articles in contact with a conductive electrode, and bringing the glass articles into the field of this mist.

In this way, the particles are distributed homogeneously on the surfaces of the articles by means of an electric field resulting from these different polarities. Under the effect of the electrostatic attraction, charged particles reach the glass surface. It is observed that this surface brings itself, by means of a natural conduction of the glass, to the potential of the electrode. The surface conduction of glass is known to be very low, but this conduction is sufficient to allow the creation of an equipotential surface over the entire surface of a glass article. This conduction is due to a reaction of atmospheric moisture with the glass surface. It is observed in particular that the particles of the mist are appreciably attracted by these articles, to the extent that even before the articles have entered the field of this mist, they begin to become covered with particles of paint of varnish.

Moreover, with the distances involved, the distribution of the electric field lines is such that the distribution of these lines is homogeneous and, following on from this, the distribution of the water-based product is substantially uniform in density over the surface of the glass articles.

Among water-based products, the following three types are included, which differ in the size of the particles of material suspended in the water:

water-emulsified water-based products (particle size of between 0.1 and 1 micron), water-dispersed water-based products (particle size of between 0.01 and 0.1 micron), water-soluble water-based products (particle size of less than 0.01 micron).

The solubilization of the particles and the stability of such products is obtained by means of the addition of a mixture of co-solvents, including an ionizable amine, alcohols and glycols. Generally, the content of such organic co-solvents is less than 10% by mass. Preferably, the composition of the water-based product used in the process according to the invention is a mixture of water-soluble products and water-emulsified products, in proportions which give the resulting crosslinked film a compromise of mechanical properties, sheen and tension. The content of co-solvents in such products is less than 5% by mass, the solids content is between 30 and 50% by mass and the amount of water is between 45 and 70% by mass. The use of such water-based products, comprising a low content of organic co-solvents, constitutes a very great advantage with regard to respect for the environment.

According to one embodiment, another water-based product can also advantageously be used. This product is an enamel powder dispersed in water.

The use of water-based products affords a very great advantage, not only ecologically speaking, but also mechanically speaking, since their increased surface hardnesses makes them less scratchable.

The preferred spraying for the composition of a water-based product, of water-emulsified product in one example, is carried out using at least one electrostatic sprayer with a rotating bowl fixed to a machine with sequential up-anddown motion. Preferably, two atomizers are used when the articles to be coated have fine reliefs suitable for channeling the applied products, i.e suitable for running, or more generally for producing homogeneous and taut films, irrespective of their thicknesses.

Advantageously, the addition of an additional sprayer allows the coating of the articles to be carried out in two stages, i.e. "wet-on-wet" coating, such that the particles are deposited, bind together and dry gradually on the glass substrate. This arrangement also has the advantage of producing, via the first sprayer, a first wet coat which ensures, on account of its surface properties, the anchoring of a second wet coat made by the second sprayer. The rotating-bowl electrostatic sprayers are then offset on the passage along which the articles travel. At a given article throughput speed, a sufficient amount of time is thus left between the arrival of an article in front of a first sprayer and its arrival in front of a second sprayer (or optionally a third sprayer, etc.). It has thus been found in the invention that an effective compromise exists, for any water-based material, between its viscosity, the size and density of particles in the active zone and the duration of passage of an article through this zone, in order to obtain a film of given thickness and especially of acceptable quality.

The glass articles are held by an electrode, a metallic component, connected to earth such that the charges on the particles, which have been distributed on the surface of the articles, are dissipated to earth.

The process according to the invention allows the production of very homogeneous films of varnish, without any running along the walls of the articles or any spattering. The tension of the coatings obtained is consequently of a very much higher quality than the tension of the coatings obtained with standard spraying processes. Moreover, no area is inaccessible, the fine particles of varnish being applied easily to all the corners of articles with the most complex of shapes.

The yields of deposit obtained by this process are very appreciable and greater than 85%. Moreover, the adjustment times are extremely short since it suffices to fix the articles on a conveyor which then makes them travel in front of the rotating-bowl electrostatic sprayers. It is moreover possible to leave the articles in a static position in front of a bowl or, still without making them travel, to subject them to a continuous or alternate rotational motion. It appears that, except for complex shapes, the distribution of the electrostatic field lines is such that the particles become deposited even on the back of the article, relative to its aspect facing the bowl. Changing the orientation is an additional improvement.

BRIEF DESCRIPTION OF THE DRAWINGS

Other particular features and advantages of the present invention will become apparent on reading the description, given by way of non-limiting illustration, with reference to the attached figures, in which:

FIG. 1 is a flow diagram of the various steps in a process according to the invention.

DESCRIPTION OF THE PREFERRED EMBODIMENTS

Figure 2:
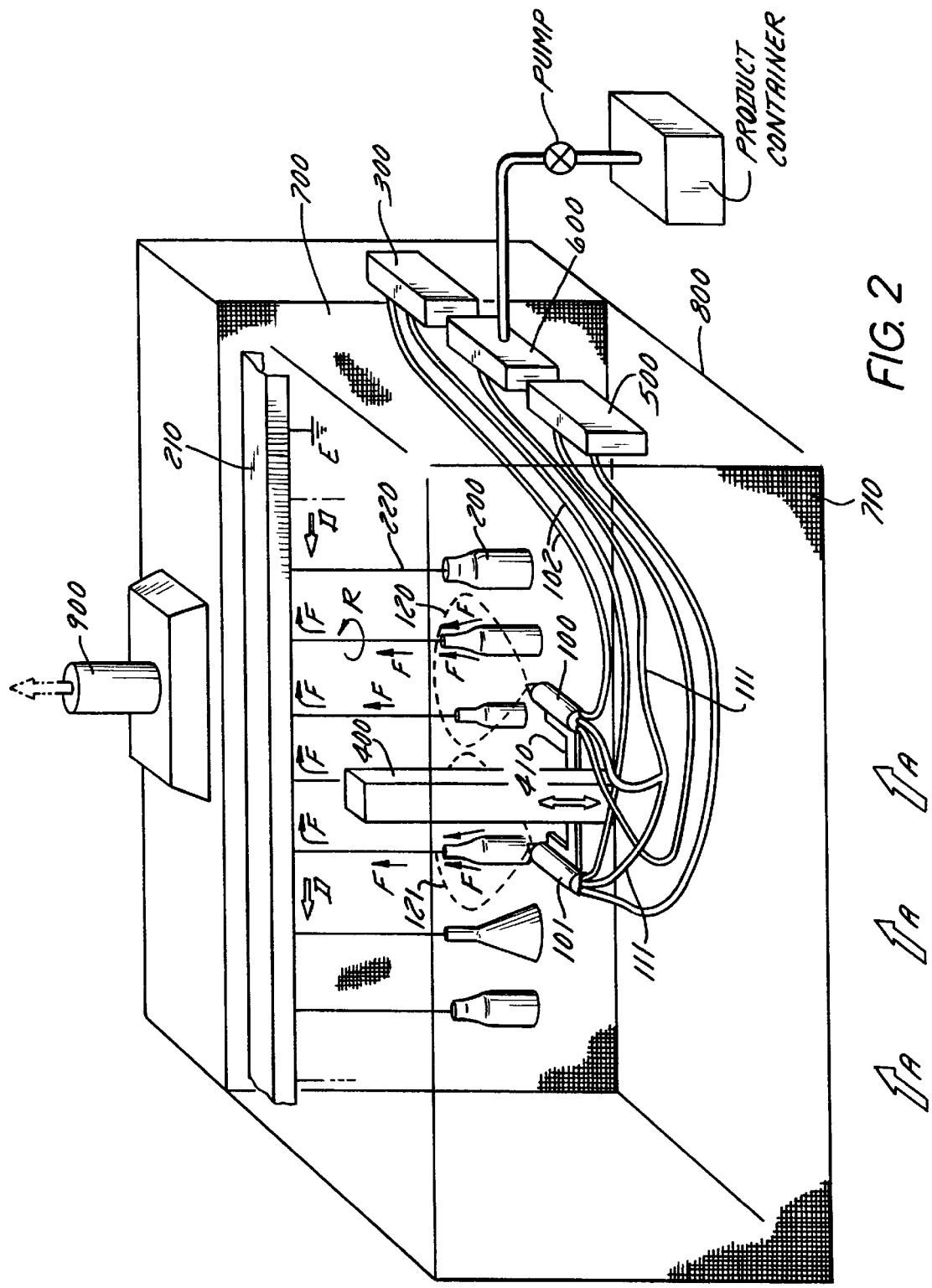
FIG. 2 is a perspective schematic view of a device for carrying out a process according to the invention.

FIG. 1 summarizes the various steps of one embodiment of a process according to the invention. A first step 1 consists in charging the water-based paint or varnish composition to a negative or potential. In one example, this potential is negative. This charging is carried out using a high-voltage generator connected to at least one electrostatic rotating bowl.

In a second step 2, the electrically charged paint or varnish composition is sprayed. It is the electrostatic rotating bowls which allow this spraying to be carried out, since a bowl has the advantage of spraying the product as fine particles of homogeneous size. It also allows, in particular with the assistance of a flow of compressed air, the resulting fine particles to diffuse in a wide zone so as to form a mist; this is step 3. This flow of air, which may not be essential, makes it possible, by means of its force, to determine the size of the diffusion field, which is also referred to as the "impact", and to contribute, with the throughput speed of the articles, toward obtaining the correct density of particles in the mist.

Lastly, the final step 4 consists in placing the glass articles in the particle diffusion zone. The phenomenon of surface conductivity of the glass allows the particles to be distributed homogeneously at the surface of the articles.

It will be noted that steps 1, 2 and 3 are presented here successively. However, they can be simultaneous, or can even take place in reverse order.

The process according to the invention is applicable to all types of glass and to articles with all kinds of more or less complex shapes. These articles are, for example, bottles, carafes, flasks, jars, vases, etc.

According to one embodiment, the water-based product used can be, for example, a water-dispersed enamel powder. In this case, the water-dispersed powder is applied to the surface of glass articles in the same way as that which has just been described. After applying this powder, an essential additional step of heat treatment chemically bonds the enamel particles to each other and to the glass substrate. By virtue of this heat treatment and depending on the particle size of the water-dispersed enamel particles, on the one hand, and their chemical composition, on the other hand, either a transparent or opaque, shiny film is thus obtained, giving the bulk a colored appearance, or a translucent or opaque, matt film is obtained, giving a chemical satin-effect or sandy appearance.

FIG. 2 is a perspective view of a device for carrying out the process according to the invention, in which the dimensions have not been respected in order to allow clearer comprehension.

This device is insulated, in particular from dust, in a painting booth 800. In a preferred example, the painting booth contains dry filters. Two of these dry filters are represented in FIG. 2 and denoted by the references 700, 710. The filter 710 is intended to filter the air introduced into the booth according to the arrows A in FIG. 2. This air is constantly renewed inside the booth, via a control unit, known as a "Make Up", which draws in air from the outside and filters it, and a suction system 900 which expels the air to the outside. The filter 700 is intended to recover, under the effect of this air, the particles of varnish and/or paint not deposited on the articles. The filter 700 is designed to be retreated by incineration. The advantage of using dry filters instead of wet filters is linked here to the low reject level. Consequently, despite its exploitation cost, which in theory is higher than that regarding the use of a wet filter, the dry filter here is all the more advantageous since it reaches saturation later on account of the very high deposition yields mentioned above. Furthermore, no maintenance is required in using such a filter.

The reference numeral 210 denotes a metallic conveyor, in this case an aerial conveyor, connected to earth E. Other types of conveyors can be used, such as, for example, an inverted conveyor. The conveyor 210 comprises several metallic components 220 each formed of a conducting rod and an end piece. Each end piece is pushed into the orifice of a hollow glass article, such as a bottle 200, for example, so as to hold it and connect it to earth E via the metal rod and the metal conveyor 210. The end piece can be a metal brush, for example, which is engaged in each article to maintain it. In order to prevent the inside of the article from becoming contaminated with the water-based product, screens are fitted to the rods to mask the orifice of the articles into which the end piece is inserted.

In this description, only articles made of hollow glass are mentioned. However, it is entirely possible to envisage carrying out the process according to the invention on articles made of solid glass, for example glass stoppers. In this case, the end pieces, capable of holding the articles, are in the form of pincers, for example.

The conveyor 210 allows the bottles 200 to travel through at a constant speed, of about 4 to 8 meters/minute, for example. This throughput is represented by the arrows D in FIG. 2. The conveyor 210 also allows the rods to be rotated according to the arrows R, and consequently the bottles 200 about themselves. The rotation speed is preferably less than or equal to 60 rpm for articles which are not axisymmetric relative to the axis of rotation. The criterion for adjusting the speed consists in attempting to arrange it such that the article makes a rotation about itself even while it is traveling through the diffusion field of the water-based product particles. A speed of greater than 60 rpm runs the risk of giving rise to a "ventilation" effect on objects which are not axisymmetric, leading to the appearance of disruptions when the paint is applied and the production of a poor-quality coating. It is observed, however, that the distribution of the electrostatic field lines is not adversely affected by such a rotation, which is far too slow on the scale of light propagation.

It is thus possible to apply all sorts of compositions of water-based products: water-emulsified, water-soluble or water-dispersed products or even a mixture comprising a determined proportion of products belonging to these three families, the agent emulsified, dissolved or dispersed in the water being a polymer or an enamel. The water-based paints and varnishes can also be either two-component or one-component. In the first case, curing of the film applied is brought about by the chemical reaction of two emulsified, dispersed or dissolved resins (a base and a hardener). In the second case, curing of the film applied is brought about by the crosslinking of a single emulsified, dispersed or dissolved resin.

Moreover, in all the standard processes for applying varnishes and/or paints to glass articles, it may be necessary to apply a product known as an "adhesion primer" beforehand to the surface of the articles. Its role consists in preparing the glass surface before applying the water-based varnishes and/or paints, in order to ensure, on the one hand, durable and homogeneous adhesion of the coatings, and, on the other hand, durable trapping in the film of the pigmentary and coloring fillers included in the composition. However, this adhesion primer must be applied so as to form a dry film whose thickness is necessarily less than 2 $\mu$m since, beyond this thickness, it tends to lose its abovementioned properties. Since the dry film formed is transparent, it cannot be revealed either visually or by touching, as a result of which an operator has considerable difficulty in guaranteeing the homogeneity of the thickness of the film applied, according to the standard processes, using pneumatic spray guns.

The process according to the invention solves this problem of the prior art since such a primer can be dissolved in water and can consequently be applied very homogeneously to the surface of the articles using a rotating-bowl electrostatic sprayer.

A first preferred embodiment of the process according to the invention consist in introducing this concentrated adhesion primer directly into the final composition of the water-based product. The preparation of the glass surface and the application of the varnish or the paint are then carried out at the same time. In this case, the adhesion primer is introduced into the base stock of water-based product composition in a proportion of from 1 to 5% by mass. On account of its chemical nature, which creates affinities with the glass surfaces, the adhesion primer migrates spontaneously toward the surface of the glass article, while the film of water-based paint or varnish is still wet.

Advantageously, the water-based product composition is negatively charged and then sprayed as fine particles by means of two rotating-bowl electrostatic sprayers 100, 101. These two sprayers are fixed to a horizontal axle 410 attached to a machine 400 with sequential up-and-down motion. The bowls rotate at an adjustable speed of rotation which can be up to 60,000 rpm. However, good results can be obtained at and above a speed of 30,000 rpm. Thus, by virtue of their centrifugal effect, these bowls spray the water-based product as fine particles of homogeneous size. Furthermore, the rotation of the bowls is adjusted to a constant speed throughout the process, irrespective of the conditions under which the product is injected into the bowls. This adjustment is controlled by a pneumatic box 500.

The rotating-bowl electrostatic sprayers used are preferably sold under the name “AEROBELL®” by the American company I.T.W. Ransburg.

The vertical-sweeping machine 400 is programed such that relatively long time intervals are chosen when the bowls 100, 101 are opposite the most complex parts of the articles, such as particularly flat shoulders of carafes, for example, while shorter time intervals are chosen when the bowls are opposite simpler shapes, such as the cylindrical body of a champagne bottle, for example.

A high-voltage generator 300, intended to deliver a negative voltage of between 0 and 100 kilovolts, is connected to the bowls 100, 101 via high-voltage cables 102. This negative voltage charges the water-based product introduced into the pipeline 110, 111 of each of the two rotating-bowl sprayers 100, 101. Preferably, the product is charged to a potential of between −50 and −100 KV, for example −70 KV.

The box 500 provides three adjustment functions. Firstly, it allows adjustment of the air flow which feed a turbine driving the bowl. The turbine rotates faster the faster the air flow. This speed of rotation conditions the size and speed of the particles which become detached from the bowl. The higher the speed of rotation, the finer these particles and the greater their kinetic energy. Secondly, the box 500 allows adjustment of the flow of water-based product diffused by the bowl. This flow must be sufficiently low for the application of a first anchoring coat by a first bowl. This furthermore avoids the phenomena of running mentioned above. Thirdly, the box 500 allows adjustment of the air flow of the skirt which surrounds the bowl and which conditions the bowl’s diffusional aperture angle, i.e. the sprayer’s impact diameter. The greater the skirt air flow, the smaller the diameter of the diffusion zone of the particles.

Preferably, the diameter of each bowl 100, 101 is greater than 30 mm, i.e., for example, 57 mm, since a smaller diameter runs the risk of giving rise to harmful spattering phenomena at the surface of the articles. In fact, at a set turbine speed, the larger the diameter of the bowl, the greater the speed along its circumference and, consequently, the higher the kinetic energy of the particles. This increase in kinetic energy goes toward better scattering of the particles and more homogeneous distribution of them at the surface of the articles.

Moreover, the containers containing the water-based paints and/or varnishes are insulated from the high voltage for safety reasons. For this, an insulating "shuttle" system is used, which is located between the supply pumps and the sprayers. The pumps are intended to draw up the water-based products in the containers directly by suction. The assembly composed of the insulating system and the pumps is represented schematically in FIG. 2 by the unit denoted by the reference numeral 600. The insulating system used is, for example, the system sold under the name "Aguablock" by the company I.T.W. Ransburg. The containers are outside the booth. The unit 600 is located next to a wall of the booth facing these containers which can thus be filled without entering the booth.

The viscosity of the water-based products is preferably between 0.2 and 0.7 poise, for example 0.45 poise.

Moreover, the surface of the glass articles 200 is preferably maintained at a distance of between 10 and 30 cm, preferably 20 cm, from the bowl 100, 101 facing it, when these articles are in the axis of diffusion.

The minimum distance between two successive glass articles is about 1 cm.

The negatively charged particles accumulate and then become distributed at the surface of a glass article 200 and the negative charges are channeled and then dissipated to earth E via the metallic component 220 and the metallic conveyor 210, as indicated by the arrows F in FIG. 2.

The article did not undergo any repulsion phenomenon. The surface conductivity of the article required for distribution of the particles and for dissipation of the negative charges, which appears when the articles are inserted in the diffusion zone of these particles, is in fact due to the absorption by the glass surface of a very thin film of water, of microscopic thickness, derived from the moisture in the ambient air.

Preferably, the surface temperature of the glass article is between 15 and 30° C., in order to avoid premature drying of the product particles which may take place if the temperature is too high. This temperature thus allows the particles to bond together at a reasonable rate to form a coating with high-quality tension. If it is too low to allow good drying, it suffices to space the bowls out slightly in order to apply a second coat under good conditions.

The temperature of the air circulating in the booth is between 15° C. and 25° C., preferably 20° C. The relative hygrometry, which contributes toward obtaining a film of varnish with high-quality tension, is preferably between 40 and 70%; in one example it is equal to 55%. The reason for this is that if the hygrometry value is less than 40%, the particles of water-based product have a tendency to dry before reaching the glass surface, and, conversely, if its value is greater than 70%, the particles have a tendency to dry with difficulty after they have reached the glass surface. The adjustment of the temperature-hygrometry couple for the air circulating in the booth is carried out in the "Make Up" control unit via an air stream burner and a humidifier.

The use of at least two bowls 100, 101 is advantageous and gives a better quality of coating than a coating prepared using only one bowl. The two bowls allow two successive coats of water-based products to be applied. Thus, when an article is inserted in the field of a first mist of particles 120, created by the first bowl 100, it is coated with a first coat of varnish or paint, and then, when it passes into the field of a second mist of particles 121, created by the second bowl 101, a second coat of varnish or paint is applied over the first coat which is still wet.

The production of a better quality coating is explained by the fact that the successive coats are applied in a "wet-on-wet" manner and the appearance of defects such as running, orange-peel and spattering is avoided. Whereas the first coat should not be too thick for the reasons given above, it is possible to increase the flow rate of water-based product from the second bowl relative to the flow rate of the first, in order to reach the desired thickness.

Hereinabove, the use of two bowls moving vertically in a synchronized manner has been described, but it is entirely possible to envisage using two synchronized arrays of several bowls arranged on top of each other in order to create monochromic or bichromic shaded effects on the articles using different colors of paints for each bowl, for example.

A second embodiment of the process according to the invention consists, when the adhesion primer is not introduced into the water-based paint or varnish composition, in applying it beforehand to the surface of the glass articles using a third electrostatic rotating bowl. This third bowl, not represented in FIG. 2, is then fixed on the same axle 410 as the other two bowls 100, 101 and is driven in the same alternating vertical motion by means of the machine with sequential up-and-down motion 400.

Advantageously, the adhesion primer used is a silane dissolved in water, in a proportion of from 1 to 5% by mass, for example 2%. It is applied in proportions identical to those of the water-based product finish composition. For example, for an overall flow rate of finish, containing 40% solids, equal to 90 ml per minute, a primer containing 2% solids is sprayed at a flow rate of 90 ml per minute.

In this case, the process for applying the varnishes and/or paints takes place in two stages. The additional prior step consequently consists in charging the adhesion primer to a negative potential and then spraying it using a third bowl. The fine particles resulting from the spraying are then diffused over a wide area to form a mist. Lastly, the glass articles are placed in the field of this mist. The particles become distributed homogeneously over the walls of the articles and create a dry film of silane about 1 micron in thickness.

The particles are distributed at the glass surface in the same way as described above, i.e. the particles accumulate at the surface and are then distributed, under the effect of the natural surface conductivity of the glass which is established by virtue of the absorption by the glass surface of a very thin film of water derived from the ambient air. The negative charges are then dissipated to earth via the rod 220 and the metallic conveyor 210.

This additional step applies the water-soluble adhesion primer very homogeneously and ensures very high-quality adhesion of the varnishes or paints subsequently applied.

The water-soluble adhesion primer used can, indifferently, be either a one-component or a two-component primer. Preferably, the successive steps take place in a "wet-on-wet" manner, i.e. the finish, composed of water-emulsified varnish or paint, is applied while the coat of adhesion primer applied previously is not yet dry.

Advantageously, the speed of the turbine for the third bowl is adjusted to a value which can be from 30,000 to 60,000 rpm.

Needless to say, the device used can comprise more than three bowls. It can, for example, comprise three application posts each reserved respectively for the application of the adhesion primer, for the application of two successive finishes involving two shades to achieve shaded color effects, using, for example, a different color for each bowl.

Advantageously, the two bowls 100 and 101 are separated from each other by a value such that any risk of overlapping of the respective diffusion zones 120, 121 which would be liable to create disturbances, is avoided. Consequently, the minimum distance separating two bowls is equal to the maximum value of the diameter of the diffusion zone of each of these bowls. Thus, for bowls with 57 mm turbines, the distance separating the two bowls is at least equal to 700 mm when the diffusion field is widest.

Needless to say, this minimum distance also applies when a third bowl is used to apply the adhesion primer before the finish.

The thickness of the coating obtained depends on the duration of application of the particles to the surface of a glass article and on the particle density.

In the preferred example, 3000 champagne bottles coated with a dry coating about 20 μm in thickness can be produced in one hour.

The process according to the invention gives very homogeneous films of varnish, without any running along the walls of the articles or any orange-peel or spattering effects. The tension of the coatings obtained is of better quality than that obtained using standard spraying processes and the products are applied easily into the corners of articles with the most complex of shapes.

The coefficients of transfer of the varnishes or paints obtained by this process are very significant since they are greater than 70% irrespective of the shape of the articles and can exceed 85% for articles with simple shapes such as champagne bottles.

Since these yields are high, the production of waste is reduced in proportion and the dry filters are changed and retreated less often than in standard processes, such that the exploitation costs are considerably reduced.

In addition, the water-based products used are not dangerous since their flash point is greater than 100° C., such that all risk of inflammation or of explosion is avoided. Furthermore, they are odorless and as such are not an inconvenience to the public. Furthermore, these products are generally less expensive than similar solvent-based products.

Lastly, by virtue of this process, it is possible to obtain, starting with colorless glass articles, glass surfaces with different appearances depending on the fillers which are mixed with the resins contained in the water-based product compositions used. Thus, the addition of transparent dyes or of pigments will give the coating the property of imitating, respectively, the coloration of the glass in the bulk or its enameling. The complementary addition of matt-effect fillers, such as microbeads of silica, of glass or of polyethylene, for example, creates a more or less shiny frosted effect to imitate the chemical satin effect. Lastly, the inclusion of fillers for screening out ultraviolet radiation makes it possible to protect certain particularly sensitive contents such as fine wines in the case of food packaging.

I claim:

1. A process for applying a water-based product to a glass article, comprising the steps of:
    a) charging a composition of the water-based product to a negative or positive polarity,
    b) spraying the composition of the water-based product so as to form particles, and diffusing the particles so as to form a field of mist,
    c) rendering a surface of the glass article electrically conductive by placing the glass article in electrical contact with a conductive electrode and maintaining a surface of the glass article at a temperature of between 15° C. and 30° C.,
    d) and, while the glass article is in electrical contact with the electrode, bringing the glass article into the field of mist.

2. The process as claimed in claim 1, wherein the water-based product composition is sprayed as particles using at least one adjustable-speed rotating-bowl electrostatic sprayer.

3. The process as claimed in claim 1, wherein the water-based product composition comprises an amount of organic co-solvents of less than 10% by mass and a solids content of between 30 and 50% by mass.

4. The process as claimed in claim 1, further comprising
    electrically grounding the electrode such that negatively or positively charged particles that have accumulated and that have then become distributed on the surface of the glass article are channeled and then dissipated to ground.

5. The process as claimed in claim 1, which comprises a step for
    introducing an adhesion primer into the water-based product composition.

6. The process as claimed in claim 1, wherein the water-based product does not comprise any primer, and further comprising, prior to the step d), priming the surface of the glass article using a water-based primer comprising an adhesion primer dissolved in water.

7. The process as claimed in claim 6, in which
    the water-based primer is sprayed as particles using an electrostatic rotating bowl which exerts its action before the water-based product composition is applied to the surface of the glass article.

8. The process as claimed in claim 1, in which
    the water-based product composition and/or an adhesion primer are charged to a negative potential of between −50 kilovolts and −100 kilovolts.

9. The process as claimed in claim 1, in which
    the viscosity of the water-based product composition is between 0.2 and 0.7 poise.

10. The process as claimed in claim 1, in which
    the distance between the surface of the glass article and an electrostatic rotating bowl that sprays the water-based product composition is between 10 and 30 cm.

11. The process as claimed in claim 1, in which the step d) is performed in a painting booth, and wherein a relative hygrometry of ambient air circulating in the painting booth is between 40 and 70%.

12. The process as claimed in claim 1, in which the step d) takes place in a painting booth, and an wherein an ambient temperature of ambient air circulating in the painting booth is adjusted to be between 15° C. and 25° C.

13. The process as claimed in claim 2, in which
    the glass article travels on a conveyor at a constant speed in front of the bowl and rotates at a speed of less than or equal to 60 rpm.

14. The process as claimed in claim 2, in which
    the glass article is axisymmetric, travels at a constant speed in front of the bowl, and rotates at a speed of greater than or equal to 60 rpm.

15. The process as claimed in claim 1, in which the water-based product composition is sprayed using at least two electrostatic rotating bowls, and in which the distance between the two bowls is greater than or equal to the value of a diameter of the field of mist.

16. The process as claimed in claim 1, in which the field of mist is wrapped with a skirt of air by directing air around the field of mist from a pneumatic box, the pneumatic box being capable of adjusting the airflow rate therefrom.

17. The process as claimed in claim 3, wherein the water-based product composition comprises an amount of organic co-solvent of less than 5% by mass and a solid content of between 30% and 50% by mass.

18. The process as claimed in claim 8, wherein the negative potential is of 70 kilovolts.

19. The process as claimed in claim 9, wherein the viscosity of the water-based product composition is 0.45 poise.

20. The process as claimed in claim 10, wherein the distance between the bowl and the surface of the glass article is 20 cm.

21. The process as claimed in claim 1, wherein the relative hygrometry of the ambient air circulating in the painting booth is 55%.

22. The process as claimed in claim 12, wherein the ambient temperature of the ambient air circulating in the paining booth is 20° C.

23. A process for supplying a water-based product to a glass article; comprising a) charging a composition of said water-based product to a negative or positive polarity;

b) spraying said composition of said product into an ambient atmosphere so as to form a field of an electrically-charged mist of said composition;

c) rendering a surface of a glass article electrically conductive by placing said glass article into electrically conductive contact with a conductive electrode and maintaining said surface of said article at a temperature of between 15° C. and 30° C.; and d) while said glass article is in electrically conductive contact with said electrode and said surface of said glass article is maintained at a temperature of between 15° C. and 30° C., bringing at least said surface of said glass article into said field so that said composition is electrostatically attracted to said surface of said glass article and adheres to said surface.

24. A process as recited in claim 23, wherein said electrode is grounded during said steps c) and d).

25. A device for carrying out a process for applying a water-based product composition to glass articles, comprising:

a dry-filter booth;

a vertically reciprocatable machine on which is fixed at least one electrostatic rotating bowl capable of spraying the water-based product;

an electrically grounded metallic conveyor comprising at least one metallic rod having a metallic end piece which is capable of electrically contacting and physically supporting a glass article and which is capable of transporting the glass article in front of the bowl;

a high-voltage generator electrically connected to the bowl and to ground and capable of giving the bowl a polarity relative to ground;

a pneumatic box capable of adjusting 1) an ambient airflow in the dry-filter booth, 2) a flow of a water-based product composition diffused by the bowl and 3) a flow of a skirt of air from the bowl and a system that insulates the electrically charged water-based product composition from the high voltage generator, the system being connected to a device for pumping the water-based product composition from a container.

* * * * *